US012716708B2

(12) United States Patent
Mishima et al.

(10) Patent No.: US 12,716,708 B2
(45) Date of Patent: Aug. 25, 2026

(54) DISPLACEMENT ESTIMATION APPARATUS, DISPLACEMENT ESTIMATION METHOD, AND COMPUTER-READABLE RECORDING MEDIUM

(71) Applicant: NEC Corporation, Tokyo (JP)

(72) Inventors: Sakiko Mishima, Tokyo (JP); Takahiro Kumura, Tokyo (JP); Murtuza Petladwala, Tokyo (JP)

(73) Assignee: NEC CORPORATION, Tokyo (JP)

(*) Notice: Subject to any disclaimer, the term of this patent is extended or adjusted under 35 U.S.C. 154(b) by 127 days.

(21) Appl. No.: 18/725,228

(22) PCT Filed: Jan. 13, 2022

(86) PCT No.: PCT/JP2022/000987
§ 371 (c)(1),
(2) Date: Jun. 28, 2024

(87) PCT Pub. No.: WO2023/135715
PCT Pub. Date: Jul. 20, 2023

(65) Prior Publication Data
US 2025/0060211 A1 Feb. 20, 2025

(51) Int. Cl.
*G01B 11/02* (2006.01)

(52) U.S. Cl.
CPC .................................... *G01B 11/02* (2013.01)

(58) Field of Classification Search
CPC ...................................................... G01B 11/02
See application file for complete search history.

(56) References Cited

U.S. PATENT DOCUMENTS

2009/0267778 A1* 10/2009 Takeshita ......... H04B 10/07953 340/600

FOREIGN PATENT DOCUMENTS

| | | | |
|---|---|---|---|
| JP | H04-248426 | A | 9/1992 |
| JP | H04-248436 | A | 9/1992 |
| JP | 2001-272213 | A | 10/2001 |
| JP | 2017-027468 | A | 2/2017 |
| JP | 2020-134264 | A | 8/2020 |
| WO | 96/035935 | A1 | 11/1996 |
| WO | 97/048994 | A1 | 12/1997 |
| WO | 97/048997 | A1 | 12/1997 |
| WO | 2019/189192 | A1 | 10/2019 |

OTHER PUBLICATIONS

English translation of Written opinion for PCT Application No. PCT /JP2022/000987, mailed on Mar. 29, 2022.
JP Office Action for JP Application No. 2023-573723, mailed on Mar. 11, 2025 with English Translation.
International Search Report for PCT Application No. PCT/JP2022/ 000987, mailed on Mar. 29, 2022.
JP Office Action for JP Application No. 2023-573723, mailed on Jul. 15, 2025 with English Translation.

* cited by examiner

*Primary Examiner* — Georgia Y Epps
*Assistant Examiner* — Don J Williams

(57) ABSTRACT

A displacement estimation apparatus includes: a first displacement estimation unit estimates first displacement that occurred in a structure, based on change of a signal from an optical fiber cable laid in the structure; and a second displacement estimation unit that estimates bias included in the estimated first displacement, and calculating second displacement by removing the bias from the first displacement.

19 Claims, 8 Drawing Sheets

DISPLACEMENT ESTIMATION APPARATUS, DISPLACEMENT ESTIMATION METHOD, AND COMPUTER-READABLE RECORDING MEDIUM

This application is a National Stage Entry of PCT/JP2022/000987 filed on Jan. 13, 2022, the contents of all of which are incorporated herein by reference, in their entirety.

TECHNICAL FIELD

The technical field relates to a displacement estimation apparatus and a displacement estimation method for estimating displacement of a structure, and further relates to a computer-readable recording medium on which a program for realizing the apparatus and method is recorded.

BACKGROUND ART

In general, the life span of structures such as bridges is considered to be generally about 50 years. However, many structures were built at the same time during the period of rapid economic growth (the 1960s) and have exceeded their life span. As such, many of such structures need to be subjected to soundness evaluation.

An example of soundness evaluation of a structure is evaluation using displacement (bending) in the vertical direction of a structure. As a technique for measuring displacement, a distribution type optical fiber sensing technology using optical fibers is known.

As a related technique, Patent Document 1 discloses a technique for accurately specifying a location where a change has occurred in an environment. According to the technique in Patent Document 1, light pulses are transmitted through an optical fiber cable that is laid, backscattered light from a point in the optical fiber cable is detected, and the region where a change has occurred in the optical fiber cable is estimated based on the time when measurement started, the time when the measurement ended, and the pulse width of the light pulses.

LIST OF RELATED ART DOCUMENTS

Patent Document

Patent Document 1: International Patent Publication No. 2019/189192

SUMMARY OF INVENTION

Problems to be Solved by the Invention

However, when the technique of Patent Document 1 is used, a noise component is included in signals received from the laid optical fiber cable, and therefore change cannot be accurately estimated.

As an aspect, an example object of the invention is to provide a displacement estimation apparatus, a displacement estimation method, and a computer-readable recording medium that enable accurately estimating displacement of a structure using a laid optical fiber cable.

Means for Solving the Problems

In order to achieve the example object described above, a displacement estimation apparatus according to an example aspect includes:

a first displacement estimation unit estimates first displacement that occurred in a structure, based on change of a signal from an optical fiber cable laid in the structure; and a second displacement estimation unit estimates bias included in the estimated first displacement, and calculating second displacement by removing the bias from the first displacement.

Also, in order to achieve the example object described above, a displacement estimation method that is performed by a computer according to an example aspect includes:

estimating first displacement that occurred in a structure, based on change of a signal from an optical fiber cable laid in the structure; and estimating bias included in the estimated first displacement, and calculating second displacement by removing the bias from the first displacement.

Furthermore, in order to achieve the example object described above, a computer-readable recording medium according to an example aspect includes a program recorded on the computer-readable recording medium, the program including instructions that cause the computer to carry out:

estimating first displacement that occurred in a structure, based on change of a signal from an optical fiber cable laid in the structure; and estimating bias included in the estimated first displacement, and calculating second displacement by removing the bias from the first displacement.

Advantageous Effects of the Invention

As an aspect, displacement of a structure can be accurately estimated using a laid optical fiber cable.

EXAMPLE EMBODIMENT

Figure 1:
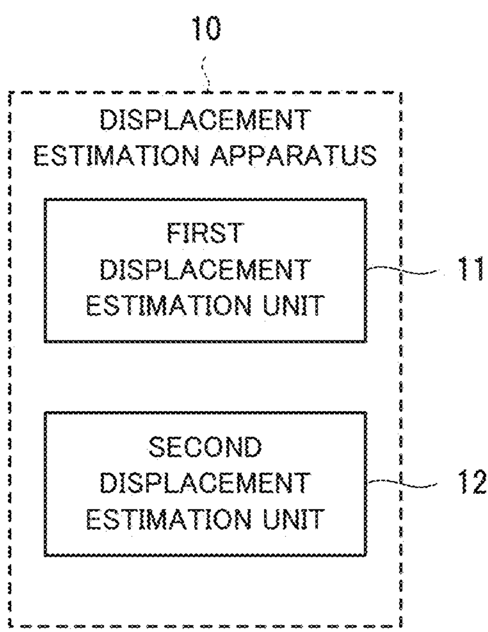
FIG. 1 is a diagram for illustrating an example of a displacement estimation apparatus according to a first example embodiment.

The following describes example embodiments of the invention with reference to the drawings. Note that, in the drawings which will be described below, the constituent elements that have the same functions or corresponding functions are given the same reference numerals, and a repeated description thereof may be omitted.

First Example Embodiment

The configuration of a displacement estimation apparatus 10 according to a first example embodiment will be described using FIG. 1. FIG. 1 is a diagram for illustrating an example of a displacement estimation apparatus according to a first example embodiment.

[Apparatus Configuration]

The displacement estimation apparatus 10 shown in FIG. 1 is an apparatus for estimating displacement of a structure in which an optical fiber cable serving as a medium of sensing is laid. Also, as shown in FIG. 1, the displacement estimation apparatus 10 includes a first displacement estimation unit 11 and a second displacement estimation unit 12.

The first displacement estimation unit 11 estimates first displacement that has occurred in the structure based on a change in a signal (measured backscattered light) from an optical fiber cable laid in the structure.

The structure is a structure constructed using metal, using a hardened material (e.g., concrete or mortar) obtained using at least sand, water, and cement, or using a combination thereof. The structure is, for example, a bridge. The structure may be the entirety or part of a structural object. Furthermore, the structure may also be the entirety or part of a machinery.

The optical path length of the optical fiber cable changes due to vibrations, sounds, and the like. The optical fiber cable is a cable for transmitting light and is formed using fused quartz, transparent plastic, and the like.

Note that, when the light fiber cable is laid in the structure, a change occurs in the optical fiber cable due to vibrations that occur in the structure. The first displacement estimation unit 11 detects vibrations by analyzing backscattered light when a change occurs in the light propagating in the optical fiber cable due to a change in the optical fiber cable. Accordingly, it can also be said that the optical fiber cable is a measurement unit for detecting (or measuring) vibrations in the structure.

The first displacement indicates a displacement amount Y0 of displacement that occurred in the structure. The displacement amount Y0 is estimated using backscattered light from a measurement position in the axial direction of the optical fiber cable.

The backscattered light is a portion of scattered light generated when light propagates in the optical fiber cable, namely the portion that scatters in the direction opposite to the direction in which the light propagates. Examples of the backscattered light include Rayleigh scattered light, Raman scattered light, and Brillouin scattered light.

In the following description, a method using Rayleigh scattered light will be described. Note that, the scattered light may also be Raman scattered light, Brillouin scattered light, or the like.

Distribution measurement is used as measurement performed using scattered light, for example. In distribution measurement, light pulses are transmitted through an optical fiber cable, and in accordance with the time difference between the transmission of the light pulses and the return of the backscattered light, the location in the optical fiber cable where the backscattered light is generated is determined.

A second displacement estimation unit 12 estimates bias included in the estimated first displacement, and calculates second displacement by removing the bias included in the first displacement.

The bias is a bias component that dynamically changes, is included in the backscattered light received from the optical fiber cable, and is generated due to a noise component that dynamically changes.

The bias is represented by a model (e.g., function, polynomial expression (bias polynomial expression), curved line, base function system) representing a plurality of first displacement values included in a time period in which no displacement was determined to have occurred and that is before or after a displacement occurrence period in which displacement was determined to have occurred. In the following description, it is assumed that the model is a bias polynomial expression. The model may be represented continuously or discretely.

The bias polynomial expression is estimated so as to fit given data, for example. The bias polynomial expression is estimated by solving a nonlinear minimization problem that minimizes the squared error for the data, for example.

The second displacement is a displacement amount Y1 obtained by removing the bias from the first displacement and correcting the first displacement. Specifically, the second displacement is calculated by subtracting the bias value at a predetermined time point from the first displacement at the predetermined time point.

In this manner, in the first example embodiment, by removing the estimated bias from the estimated displacement (first displacement), accurate displacement (second displacement) can be estimated.

Also, by using the laid optical fiber cable, accurate displacement (second displacement) can be estimated.

[System Configuration]

Figure 2:
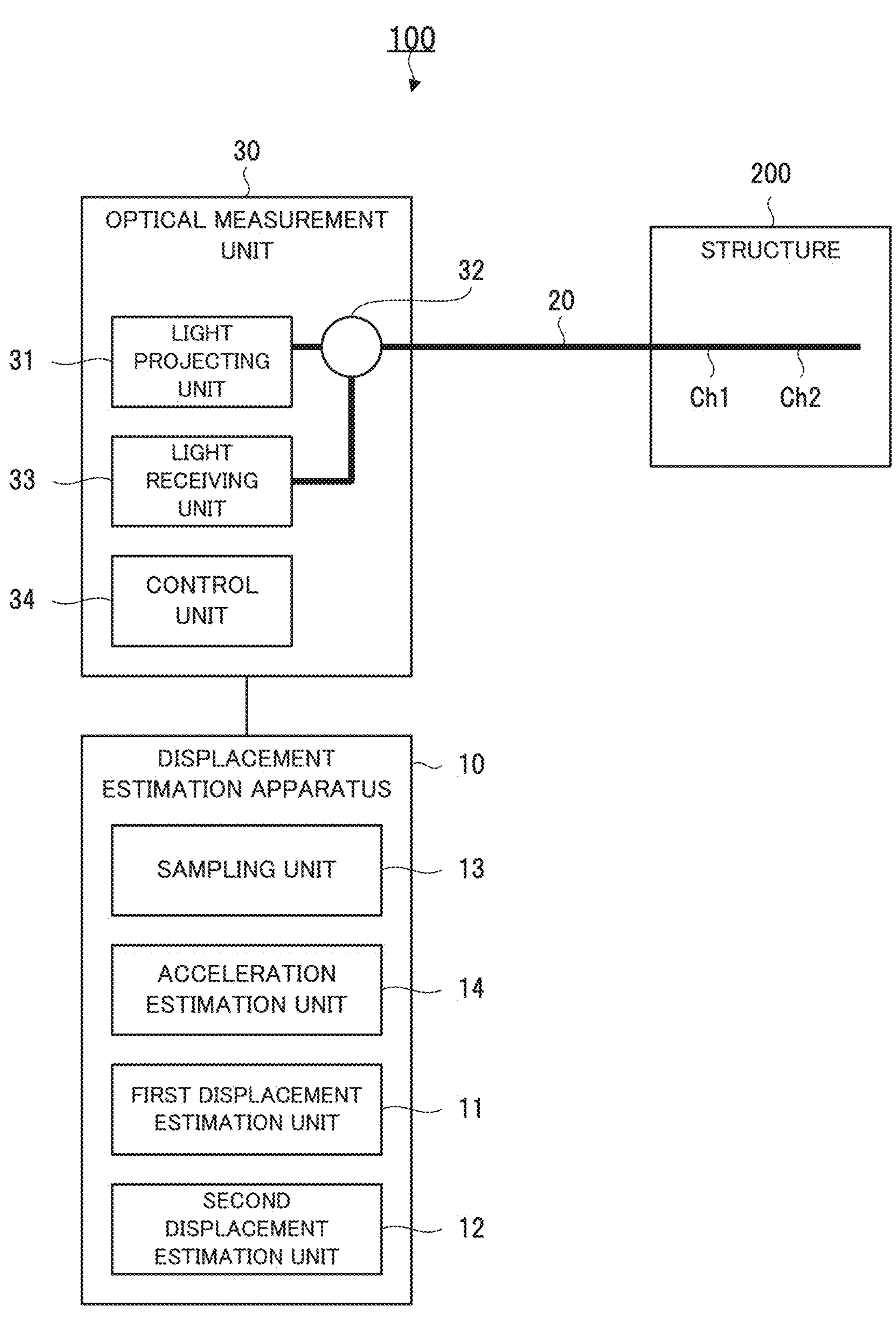
FIG. 2 is a diagram illustrating an example of a system including the displacement estimation apparatus of the first example embodiment.

The configuration of the displacement estimation apparatus 10 according to the first example embodiment will be described in more detail using FIG. 2. FIG. 2 is a diagram illustrating an example of a system including the displacement estimation apparatus of the first example embodiment.

As shown in FIG. 2, a system 100 according to the first example embodiment includes the displacement estimation apparatus 10, an optical fiber cable 20, and an optical measurement unit 30. Note that the displacement estimation apparatus 10 and the optical measurement unit 30 may be configured as one apparatus.

For example, the optical fiber cable 20 is laid in a structure 200. The optical fiber cable 20 may be laid such that the distribution measurement can be performed in order to measure displacement of the structure 200. In the case where a bridge is the measurement target, the optical fiber cable 20 may be fixed to a floor slab of the bridge using adhesive or the like, or a tube through which the optical fiber cable 20 passes through may be fixed to a lower portion or a side surface of the bridge. An optical fiber cable for communication that is already used may also be used. In addition, the optical fiber cable 20 is connected to the optical measurement unit 30.

The optical measurement unit of the first example embodiment will be described below.

First, the optical measurement unit 30 receives backscattered light from a point in the axial direction of the optical fiber cable 20, converts the received backscattered light into an electric signal, and outputs the electric signal to the displacement estimation apparatus 10. The optical measurement unit 30 includes a light projecting unit 31, an optical circulator 32, a light receiving unit 33, and a control unit 34.

The light projecting unit 31 generates light pulses to be emitted to the optical fiber cable 20. The light projecting unit 31 includes a light source portion and a light modulator.

The light source portion includes a light emitting element and a drive circuit. Examples of the light emitting element include a semiconductor laser, a laser diode (LD), a wavelength variable LD, a super luminescent diode (SLD), an ASE (Amplified Spontaneous Emission) light source, and an LED (Light Emitting Diode).

The drive circuit drives the light emitting element at a constant cycle (pulse width) and outputs light pulses from the light emitting element. The optical modulator modulates the light pulses emitted by the light emitting element, and outputs the modulated light pulses to the optical circulator.

The optical circulator 32 separates the light pulses and the backscattered light from each other. The optical circulator 32 projects the light pulses output from the optical modulator to the optical fiber cable 20. The optical circulator 32 projects the backscattered light from the optical fiber cable 20 to the light receiving unit 33.

The light receiving unit 33 receives the backscattered light via the optical circulator 32. The light receiving unit 33 includes a light detector and an A/D convertor.

The light detector converts the received backscattered light into an analog electric signal, for example. The light detector is, for example, a light-receiving element such as a photo diode (PD: Photo Detector).

The A/D convertor converts the analog electric signal that is output from the light detector into a digital electric signal using an analog-digital conversion circuit. The A/D convertor outputs the converted digital electric signal to the displacement estimation apparatus 10.

The control unit 34 controls light projecting and light receiving by controlling the light projecting unit 31 and the light receiving unit 33. The control unit 34 exchanges various types of information with the displacement estimation apparatus 10, and controls the light projecting unit 31 and the light receiving unit 33 based on the information.

The control unit 34 is realized using a CPU (Central Processing Unit), a programmable device such as an FPGA (Field-Programmable Gate Array), a GPU (Graphics Processing Unit), or a circuit in which at least one or more of these are implemented, for example.

Note that, although the optical measurement unit 30 was described as an example of an optical measurement unit, there is no limitation to the optical measurement unit 30. The optical measurement unit need only be a device that can measure backscattered light and output the measurement result to the displacement estimation apparatus 10.

The displacement estimation apparatus according to the first example embodiment will be described in detail below.

Figure 3:
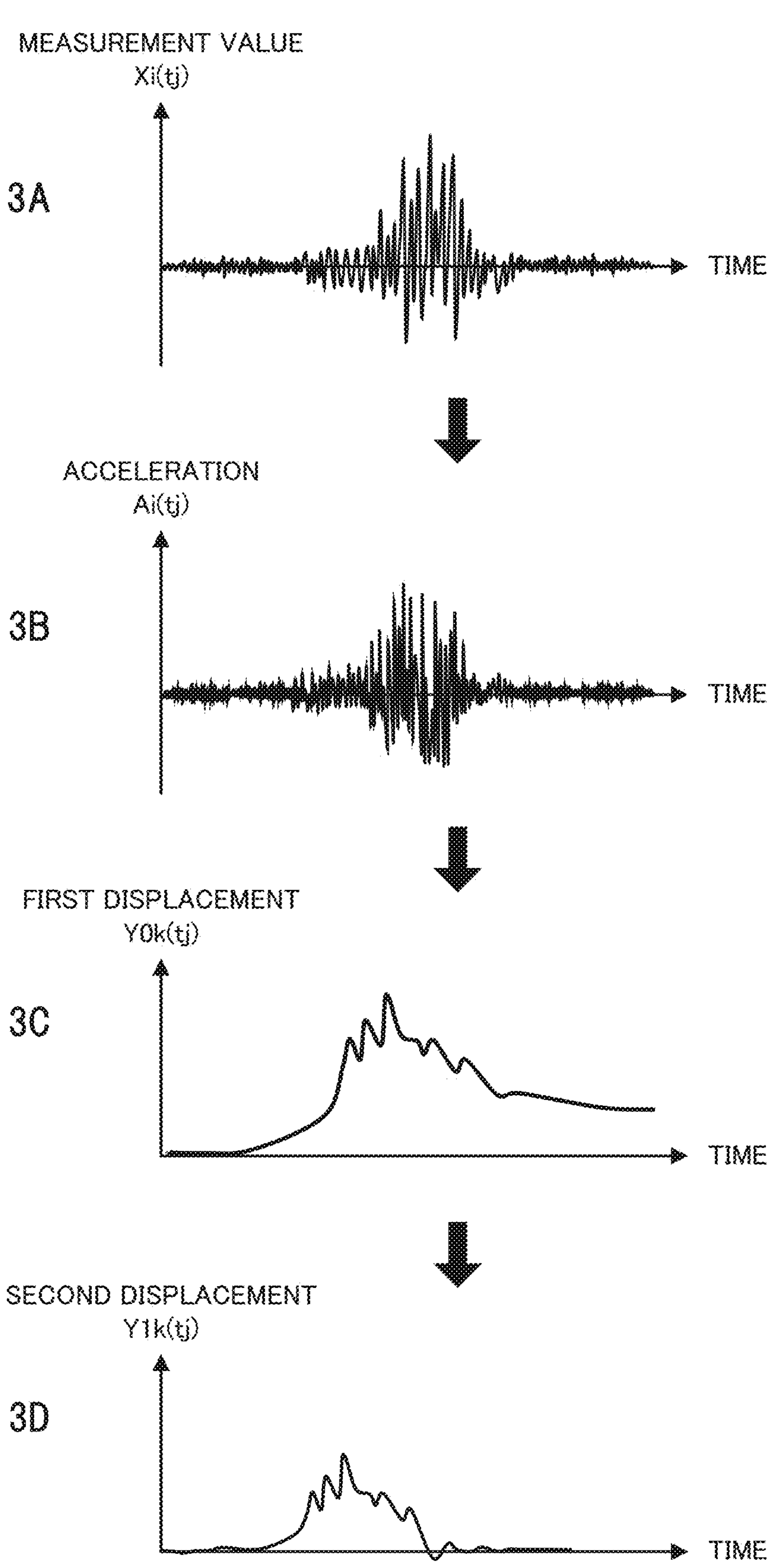
FIG. 3 is a diagram showing a waveform for illustrating operations of the displacement estimation apparatus.

The displacement estimation apparatus 10 will be described using FIGS. 2 and 3. FIG. 3 is a diagram showing a waveform for illustrating operations of the displacement estimation apparatus.

The displacement estimation apparatus 10 obtains digital electric signals from the optical measurement unit 30, and executes the later-described signal processing using the obtained digital electric signals. The displacement estimation apparatus 10 includes a sampling unit 13, an acceleration estimation unit 14, a first displacement estimation unit 11, and a second displacement estimation unit 12.

The displacement estimation apparatus 10 is realized using a CPU, a programmable device such as an FPGA, a GPU, or a circuit in which at least one or more of these are implemented, for example. Note that, in the example in FIG. 2, the displacement estimation apparatus 10 (signal processing function) and the control unit 34 (control processing function) are shown separately, but the displacement estimation apparatus 10 and the control unit 34 may be provided in the same device.

The sampling unit 13 extracts digital electric signals (measurement values) corresponding to a predetermined number of samples (frame length) of a predetermined channel from the digital electric signals output from the optical measurement unit 30.

The sampling unit 13 outputs the measurement values as shown in 3A of FIG. 3 in chronological order, for example. 3A of FIG. 3 shows a graph of measurement values regarding only one channel. However, actually, the sampling unit 13 may output the measurement values in chronological order for each of one or more channels.

The channels correspond to positions at which displacement is measured in the axial direction of the optical fiber cable 20 (measurement points Ch1, Ch2, etc. in FIG. 2) in the distribution measurement. The total number of channels is the same as the number of the measurement points in the optical fiber cable 20.

The sampling unit 13 outputs measurement values for each channel. A measurement value $Xi(tj)$ represents the measurement value at a time point tj (time determined by a sample rate: $j=1, 2$, etc.) of a channel i ($i=1, 2 \ldots N$).

For example, it is conceivable that the sample rate is 200 Hz and the frame length is 60 seconds. Note that, the frame length (number of samples) can be determined as desired. A length of time based on the length of time during which displacement occurs, for example, the time period during which a vehicle passes on the bridge may be set as the frame length. Alternatively, a value calculated from the total length of the bridge and the speed of the vehicle may be used as the frame length.

The acceleration estimation unit 14 estimates an amount corresponding to acceleration based on the measurement value. The measurement value of the optical measurement unit 30 depends on the measurement principle, and may be an amount of change in the unit optical path length of the optical fiber cable 20 per unit time (value related to speed), or an amount of change in the optical path length of the optical fiber cable 20 per unit optical path length (value related to displacement). Regardless of the measurement principle, in order to estimate the first displacement from the measurement value, an amount corresponding to the acceleration is used instead of directly using the measurement value. The acceleration estimation unit 14 outputs, for example, values corresponding to the acceleration as shown in 3B of FIG. 3 in chronological order. In the following description, the values corresponding to acceleration are called “acceleration” in order to simplify the description.

Note that, 3B of FIG. 3 shows a graph of acceleration regarding only the measurement values with respect to one channel. However, the acceleration estimation unit 14 may also output acceleration in chronological order for each of one or more channels.

Acceleration estimation processing will be described below. As described above, the measurement value of the optical measurement unit 30 depends on the measurement principle and may be either a value related to displacement, a value related to speed, or a value related to acceleration. If the apparatus configuration of the optical measurement unit 30 is determined in advance, the parameter that the measurement value is related to is also determined in advance. When estimating acceleration from the measurement value, numerical differentiation is used, for example. If the measurement value is related to displacement, double numeral differentiation is applied to the measurement value. If the measurement value is related to speed, single numeral differentiation is applied to the measurement value. If the measurement value is related to acceleration, no numeral differentiation is applied to the measurement value, and the measured value as-is is considered to be the acceleration.

Numerical differentiation is processing in which, with regard to a measurement value, the difference between the measurement value Xi(tj) at time tj and the measurement value Xi(tj−1) at time "tj−1" is divided by a measurement value sampling cycle dt, for example. In other words, an acceleration Ai(tj) can be represented by Expression 1.

$$Ai(tj) = (Xi(tj) - Xi(tj-1))/dt \quad \text{(Expression 1)}$$

Also, the acceleration estimation unit 14 performs processing for converting the above measurement value into a value corresponding to acceleration. Furthermore, the acceleration estimation unit 14 may remove a high frequency component and a zero frequency component from the acceleration.

In order to remove the high frequency component, for example, a digital low frequency pass filter (DLPF) that allows a frequency of 30 Hz or less to pass therethrough may be used.

Furthermore, in order to remove the zero frequency component, for example, the moving average value of acceleration may be subtracted from acceleration in a predetermined time period. Alternatively, a digital high frequency pass filter (DHPF) may also be used.

Alternatively, in order to remove the high frequency component and the zero frequency component, a digital bandpass filter (DBPF) may be used.

The first displacement estimation unit 11 estimates the first displacement that occurs in the structure 200 using the estimated acceleration. The first displacement estimation unit 11 outputs the first displacement with respect to the channel in chronological order as shown in 3C of FIG. 3, for example.

Note that, 3C of FIG. 3 shows a graph of first displacement regarding only one channel. However, the first displacement estimation unit 11 outputs the first displacement in chronological order for each of one or more channels.

Specifically, it is conceivable that the first displacement estimation unit 11 estimates the first displacement (e.g., bending of the bridge) using processing (1) and (2), which will be described below.

(1) The first displacement is estimated through double numerical integration performed using acceleration. For example, a channel k is selected as one of the channels, double numerical integration is applied using the acceleration Ak(tj) of the channel k, and a first displacement Y0k(tj) of the structure 200 is estimated. The numerical integration is realized by calculating the sum of the values at each timing in a certain time period, for example. The method of numerical integration may also be the Montecarlo method or the like, and is not limited to the above example.

(2) By processing a plurality of acceleration values using a Kalman filter, the first displacement at a given point in the longitudinal direction of the optical fiber cable 20 is estimated. For example, M channels are selected, and the first displacement is estimated (Y0k(tj)) using the acceleration Ak(tj) (K=0 to M−1) of each of M channels.

In processing (2), the first displacement is estimated using the acceleration of a plurality of predetermined positions (channels).

In processing (1) and (2), the position in the structure 200 to which the channel k corresponds is known in advance, and thus the displacement at a predetermined position of the structure 200 can be estimated.

Note that processing for estimating the first displacement is not limited to the above processing (1) and (2).

The second displacement estimation unit 12 removes bias that dynamically changes and is included in the estimated first displacement, corrects the first displacement, and estimates the second displacement. The second displacement estimation unit 12 outputs the second displacement in chronological order as shown in 3D of FIG. 3, for example.

The measurement value includes a noise component that dynamically changes. Due to the influence of the dynamically changing noise component, bias that dynamically changes and corresponds to the noise component is also included in the first displacement. In view of this, the second displacement estimation unit 12 removes the dynamically changing bias.

The second displacement estimation unit will be described in detail below.

Figure 4:
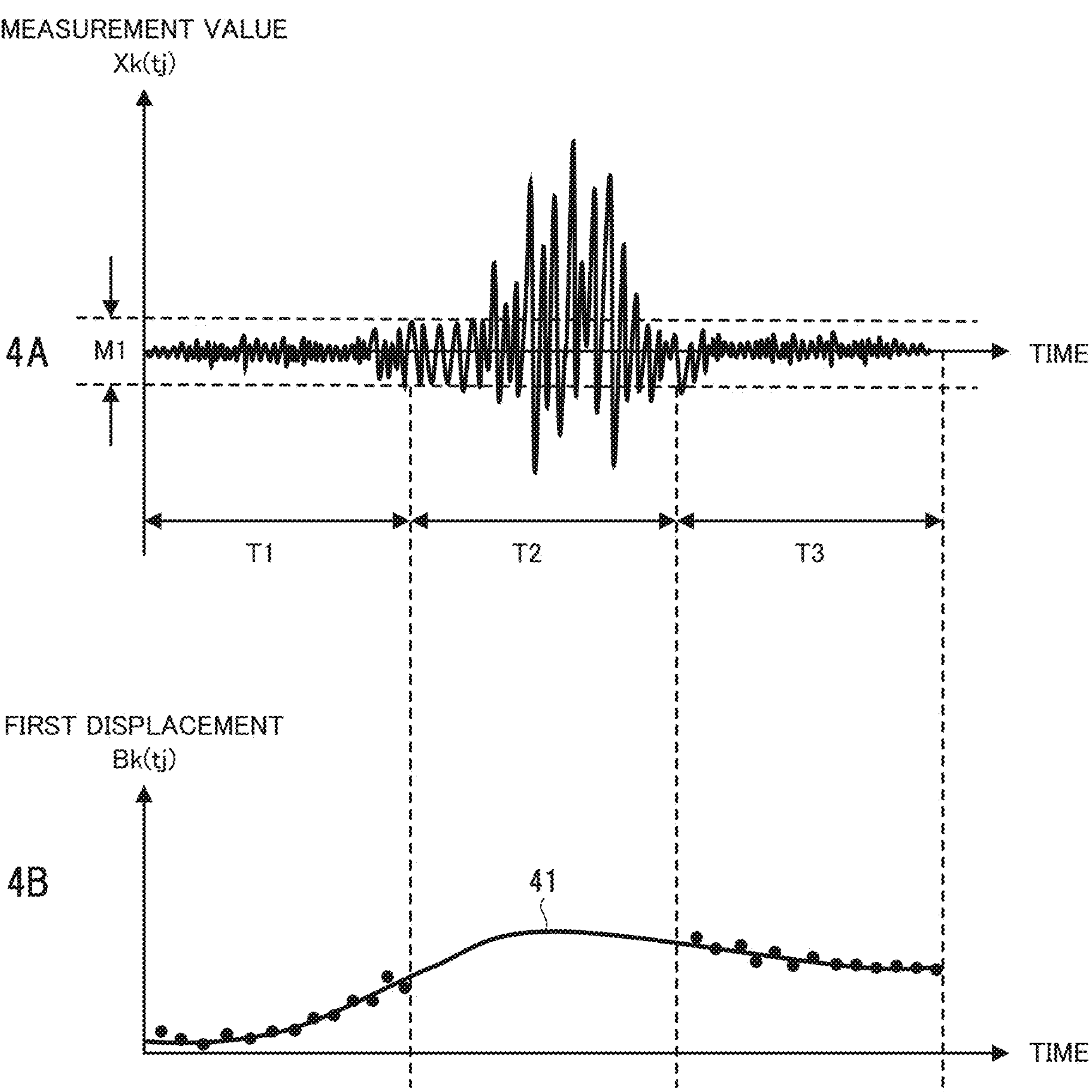
FIG. 4 is a diagram illustrating the bias.

The second displacement estimation unit 12 will be described below using FIG. 4. FIG. 4 is a diagram illustrating the bias.

First, when the absolute values of a plurality of measurement values Xk(tj) of the selected channel k (amplitude absolute value) are continuously smaller than a predetermined value for a predetermined time period or longer (or when a plurality of measurement values Xk(tj) are within a range M1 in FIG. 4), the second displacement estimation unit 12 deems that the first displacement has not occurred in that time period, and determines that time period as a time period in which the first displacement has not occurred (time periods T1 and T3 in FIG. 4).

Also, when the absolute values of the measurement values Xk(tj) of the selected channel k (amplitude absolute value) are continuously larger than or equal to the predetermined value for the predetermined time period or longer (or when the plurality of measurement values Xk(tj) are outside of the range M1 in FIG. 4), the second displacement estimation unit 12 deems that displacement has occurred in that time period, and determines that time period as a time period in which displacement has occurred (time period T2 in FIG. 4).

The predetermined time period is determined through, for example, an experiment, a simulator, or the like. The predetermined value used for determination of the time period in which displacement has not occurred (time periods T1 and T3 in FIG. 4) and determination of the time period in which displacement has occurred (time period T2 in FIG. 4) is determined based on a standard deviation of the measurement values in the state where displacement has not occurred, for example.

Next, the second displacement estimation unit 12 obtains a model (e.g., polynomial expression) representing a curved line 41 shown in FIG. 4 using the first displacement Y0k(tj) in the time periods T1 and T3 before and after the time period T2. In other words, the second displacement estimation unit 12 calculates a bias Bk(tj) in the time period T2.

Next, the second displacement estimation unit 12 subtracts the bias Bk(tj) from the first displacement Y0k(tj) to calculate a second displacement Y1k(tj) shown in Expression 2.

$$Y1k(tj)=Y0k(tj)-Bk(tj) \quad \text{(Expression 2)}$$

The polynomial expression representing the bias Bk(tj) is obtained by solving a nonlinear minimization problem to find a polynomial expression that minimizes the square error of the plurality of first displacements Y0k(tj) included in the time periods T1 and T3 in which the first displacement has not occurred, which are before and after the time period T2 in which the first displacement has occurred.

The polynomial expression representing the bias Bk(tj) is estimated for each time period in which the displacement of the measurement value Xk(t) of channel k occurs.

In other words, the model representing the bias is estimated to adapt to the displacement during the time period in which the first displacement has not occurred. Alternatively, it can be said that the model representing the bias during the time period in which the first displacement has occurred is estimated so as to adapt to the displacement in the time periods in which the first displacement has not occurred, which are before and after the time period in which the first displacement has occurred.

The time periods before and after the time period in which the first displacement has occurred do not necessarily need to be adjacent to the time period in which the first displacement has occurred. By using time periods adjacent to the time period in which the first displacement has occurred, an effect that a more accurate model can be created is achieved.

The inventors of the present application found that, in the optical fiber cable 20, the bias smoothly changes from a time period in which the first displacement has not occurred to the next time period in which the first displacement has not occurred. In other words, the inventors of the present application found that, when using the signal from the optical fiber cable 20, it is not possible to accurately estimate change due to noise that changes with a relatively long cycle. The inventors of the present application also found that the noise in the time period in which the first displacement has occurred can be removed using the created model.

Furthermore, the second displacement estimation unit 12 may also correct the second displacement Y1k(tj) by multiplying it by a predetermined coefficient, and may use the resultant value as the new Y1k(tj). This coefficient is, for example, a value representing the statistical relationship between a reference value of the amount of displacement that occurs in the structure measured using another measurement device (not shown) serving as a reference, and the second displacement Y1k(tj) corresponding to the amount of displacement.

[Apparatus Operations]

Figure 5:
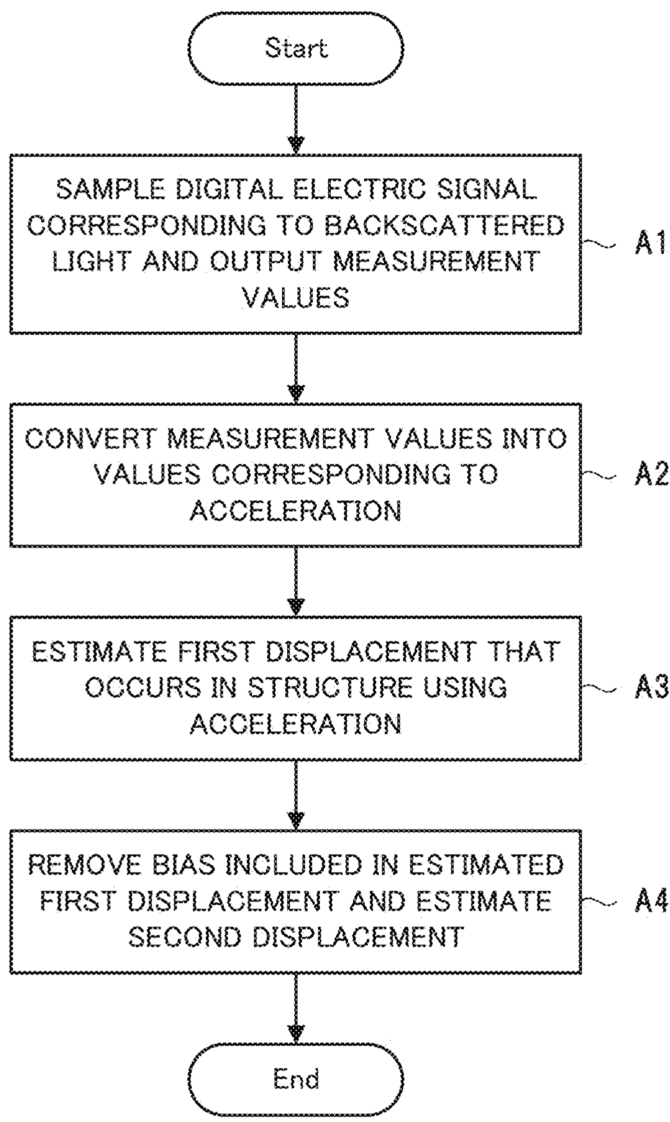
FIG. 5 is a diagram illustrating the operations of the displacement estimation apparatus according to the first example embodiment.

Operations of the displacement estimation apparatus according to the first example embodiment will be described below using FIG. 5. FIG. 5 is a diagram illustrating the operations of the displacement estimation apparatus according to the first example embodiment. In the following description, the drawings are referenced as appropriate. In addition, in the first example embodiment, the displacement estimation method is carried out by causing the displacement estimation apparatus to operate. Thus, description of the displacement estimation method in the first example embodiment is replaced with the following description of operations of the displacement estimation apparatus.

As shown in FIG. 5, first, the sampling unit 13 extracts and outputs digital electric signals (measurement values) corresponding to a predetermined number of samples in a predetermined channel from the digital electric signals corresponding to the backscattered light output from the optical measurement unit 30 (step A1).

Next, the acceleration estimation unit 14 converts the measurement values into values corresponding to acceleration (step A2). The first displacement estimation unit 11 estimates the first displacement that has occurred in the structure 200 using the estimated acceleration (step A3). Specifically, it is conceivable that the first displacement estimation unit 11 performs estimation using the above processing (1) and (2).

Next, the second displacement estimation unit 12 removes the bias that dynamically changes and is included in the estimated first displacement to correct the first displacement, and estimates the second displacement (step A4).

In step A4, first, when the absolute values of the plurality of measurement values Xk(tj) of the selected channel k (amplitude absolute values) are continuously smaller than a predetermined value for a predetermined time period or longer (or when the plurality of measurement values Xk(tj) are within the range M1 in FIG. 4), the second displacement estimation unit 12 deems that the first displacement has not occurred in that time period, and determines that time period as a time period in which the first displacement has not occurred (time periods T1 and T3 in FIG. 4).

In step A4, when the absolute values of the measurement values Xk(tj) of the selected channel k (amplitude absolute values) are continuously larger than or equal to the predetermined value for the predetermined time period or longer (or when the plurality of measurement values Xk(tj) are outside of the range M1 in FIG. 4), the second displacement estimation unit 12 deems that the displacement has occurred in that time period, and determines that time period as a time period in which displacement has occurred (time period T2 in FIG. 4).

Next, in step A4, the second displacement estimation unit 12 obtains a polynomial expression representing the curved line 41 shown in FIG. 4 using the first displacement Y0k(tj) in the time periods T1 and T3 before and after the time period T2. In other words, the second displacement estimation unit 12 calculates the bias Bk(tj) in the time period T2.

Next, in step A4, the second displacement estimation unit 12 subtracts the bias Bk(tj) from the first displacement Y0k(tj) to calculate the second displacement Y1k(tj) shown in Expression 2.

The polynomial expression representing the bias Bk(tj) is obtained by solving a nonlinear minimization problem to find a polynomial expression that minimizes the square error of the plurality of first displacements Y0k(tj) included in the time periods T1 and T3 in which the first displacement has not occurred, and which are before and after the time period T2 in which the first displacement has occurred.

The polynomial expression representing the bias Bk(tj) is estimated for each time period in which displacement of the measurement value Xk(t) of the channel k has occurred.

Effects of First Example Embodiment

According to the first example embodiment, by removing estimated bias from estimated displacement (first displacement), accurate displacement (second displacement) can be estimated. Furthermore, utilizing an existing optical fiber cable for communication eliminates the need for installing a new sensor for obtaining displacement in the structure to be measured or the surrounding thereof.

In addition, accurate displacement (second displacement) can be estimated by using the laid optical fiber cable.

[Program]

The program according to the first example embodiment may be a program that causes a computer to execute steps A1 to A4 shown in FIG. 5. By installing this program in a computer and executing the program, the security ensuring apparatus and the security ensuring method according to the first example embodiment can be realized. In this case, the processor of the computer performs processing to function as the sampling unit 13, the acceleration estimation unit 14, the first displacement estimation unit 11, and the second displacement estimation unit 12.

Also, the program according to the first example embodiment may be executed by a computer system constructed by a plurality of computers. In this case, for example, each computer may function as any of the sampling unit 13, the acceleration estimation unit 14, the first displacement estimation unit 11, and the second displacement estimation unit 12.

Second Example Embodiment

In a second example embodiment, selection of the channels by the first displacement estimation unit 11 and the second displacement estimation unit 12 described in the first example embodiment will be described.

Figure 6:
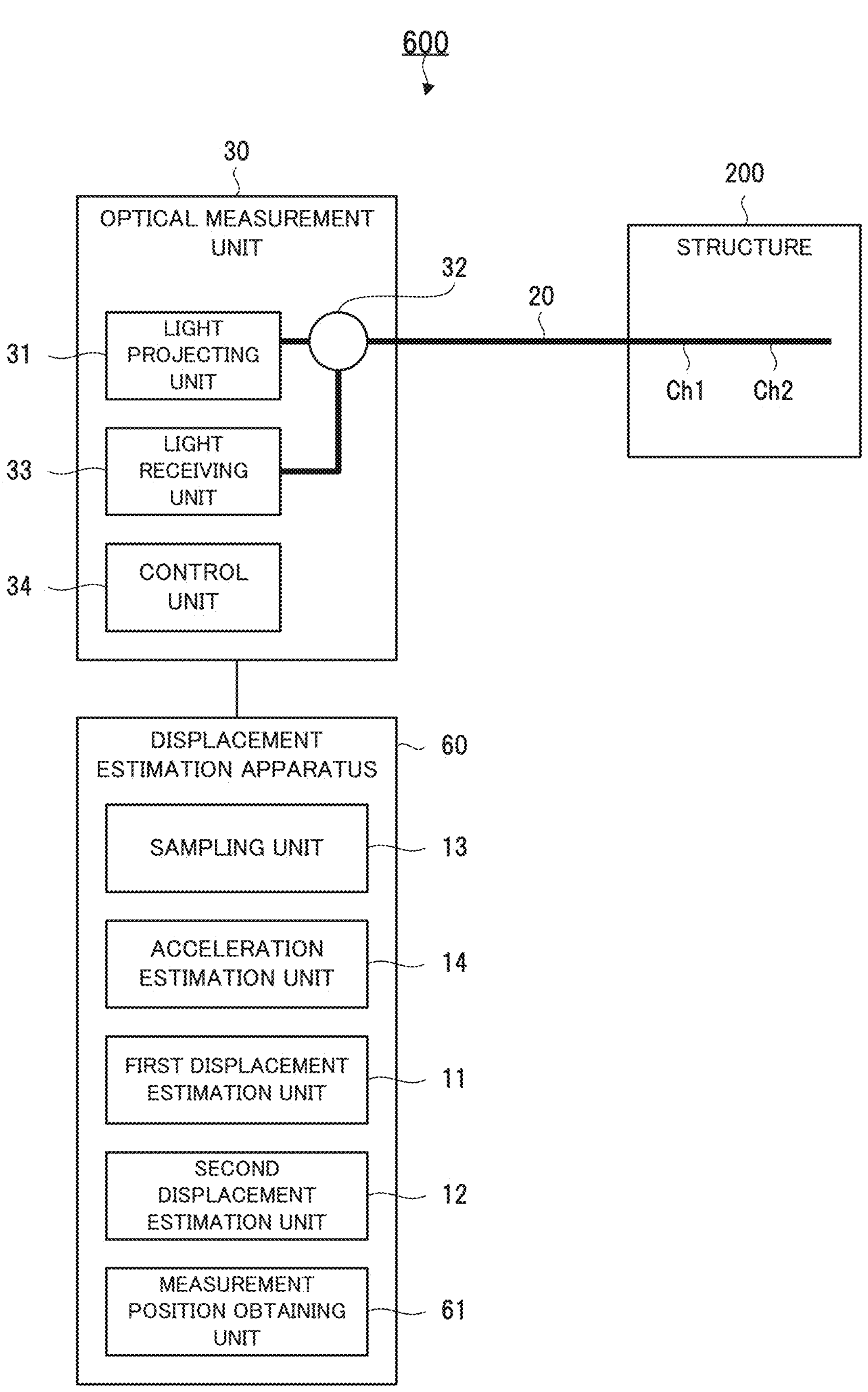
FIG. 6 is a diagram illustrating an example of a system including a displacement estimation apparatus of the second example embodiment.

FIG. 6 is a diagram illustrating an example of a system including a displacement estimation apparatus of the second example embodiment. As shown in FIG. 6, a system 600 in the second example embodiment includes a displacement estimation apparatus 60, the optical fiber cable 20, and the optical measurement unit 30. Note that the displacement estimation apparatus 60 and the optical measurement unit 30 may be configured as one apparatus.

The displacement estimation apparatus 60 of the second example embodiment includes the sampling unit 13, the acceleration estimation unit 14, the first displacement estimation unit 11, the second displacement estimation unit 12, and a measurement position obtaining unit 61.

Note that, the sampling unit 13, the acceleration estimation unit 14, the first displacement estimation unit 11, and the second displacement estimation unit 12 shown in FIG. 6 were already described in the first example embodiment, and the detailed descriptions thereof will be omitted.

The measurement position obtaining unit 61 obtains measurement position information in which measurement positions in the axial direction of the optical fiber cable 20 and positions in the structure 200 are associated with each other. The first displacement estimation unit 11 and the second displacement estimation unit 12 reference the measurement position information and select the channel representing a corresponding measurement position in the structure 200.

First, the measurement position obtaining unit 61 obtains the measurement position information from the storage device (not shown). The measurement position information is information in which measurement positions (measurement points Ch1, Ch2, etc.) in the axial direction of the optical fiber cable 20 and positions in the structure 200 in which the optical fiber cable 20 is laid (positions corresponding to the measurement points Ch1, Ch2, etc.) are associated with each other.

In addition, information in which the channel k and a distance p(k) are approximated using a function may also be used as the measurement position information. The measurement position (channel k) of the optical fiber cable 20 is represented by the distance p(k) from an end portion (start point) of the optical fiber cable 20 on the side that receives the light pulses to the measurement point (end point).

Note that the measurement positions of the optical fiber cable 20 are associated with positions in the structure 200 by referencing construction drawing information that was used when the optical fiber cable 20 was laid in the structure 200, for example. The construction drawing information is stored in the storage device (not shown).

In addition, the measurement positions of the optical fiber cable 20 may be associated with positions in the structure 200 by calculating a point (channel) having a characteristic property from chronological measurement values for each channel and using measurement position information based on the calculated point (channel).

With regard to the characteristic point, the maximum absolute value of the chronological measurement values for each channel is obtained, and a point (channel) at which the obtained value is observed is set as a point (channel) having a characteristic property. When the maximum absolute value is used, the point (channel) having the characteristic property indicates that the intensity of the measurement value is high, and it can be predicted that the amount of displacement obtained from the measurement value is also large. Therefore, the most frequent point (channel) of the maximum absolute value may be associated with the position in the structure 200 where the displacement of the structure 200 is assumed to be largest.

For example, if the structure 200 is a bridge, by using the fact that displacement at the center of the span of the upper structure of the bridge is assumed to be largest, the position where the maximum absolute value is measured is deemed to be the center of the upper structure of the bridge and set as the reference point. Then, the channels of the optical fiber cable located within the range of the bridge are associated with positions in the bridge. Furthermore, the end points of the bridge may be specified using the reference point and the span length, and these positions may be associated with channels. Note that although the above example focused on the upper structure, the invention is not limited to the upper structure. The invention can be applied to a lower structure, a support, and the like of the bridge.

The upper structure includes a floor structure and a main structure. The floor structure is formed by a floor slab, a floor assembly, and the like. The main structure includes main girders and the like, and supports the floor structure and transfers the load to the lower structure.

The lower structure includes abutments provided at both ends of the bridge, piers provided in the middle of the bridge, and foundations that support them, which support the upper structure and transmit the load to the ground.

The support is a member disposed between the upper structure and the lower structure. The support transmits the load that is applied to the upper structure to the lower structure.

Alternatively, a vibration mode analysis of the structure 200 may be performed using a plurality of acceleration values, and correspondence with the structure 200 may be estimated from the mode shape. The mode shape is obtained through a method disclosed in "Slab Vibration Model Coupled with pier Structure on Continuous Girder Bridge" by Shohei Kinoshita, Shigeru Kasai, Murtuza Petladwala, and Takaku, Hideaki, pp. 256-265 in "European Workshop on Structural Health Monitoring 2020" or the like, for example.

For example, if the structure 200 is a bridge, the positions (channels) of the center, end points, and the like of the upper structure are specified from the parts corresponding to the nodes and antinodes of the mode, and part or all of them are set as reference points, and channels of the optical fiber cable 20 within the range of the bridge are associated with positions in the bridge.

Next, with regard to the selection of the channel of the first displacement estimation unit 11, which was described in the first example embodiment, a channel corresponding to a position where the displacement is assumed to be largest in the structure 200 is determined with reference to the measurement position information.

When a plurality of channels are selected, the channels are determined with reference to the measurement position information so as to include the channel corresponding to the position where the displacement is assumed to be largest.

Next, with regard to the selection of the channel of the second displacement estimation unit 12, which was described in the first example embodiment, a channel corresponding to a position where the displacement is assumed to be largest in the structure 200 is determined with reference to the measurement position information.

[Apparatus Operations]

Figure 7:
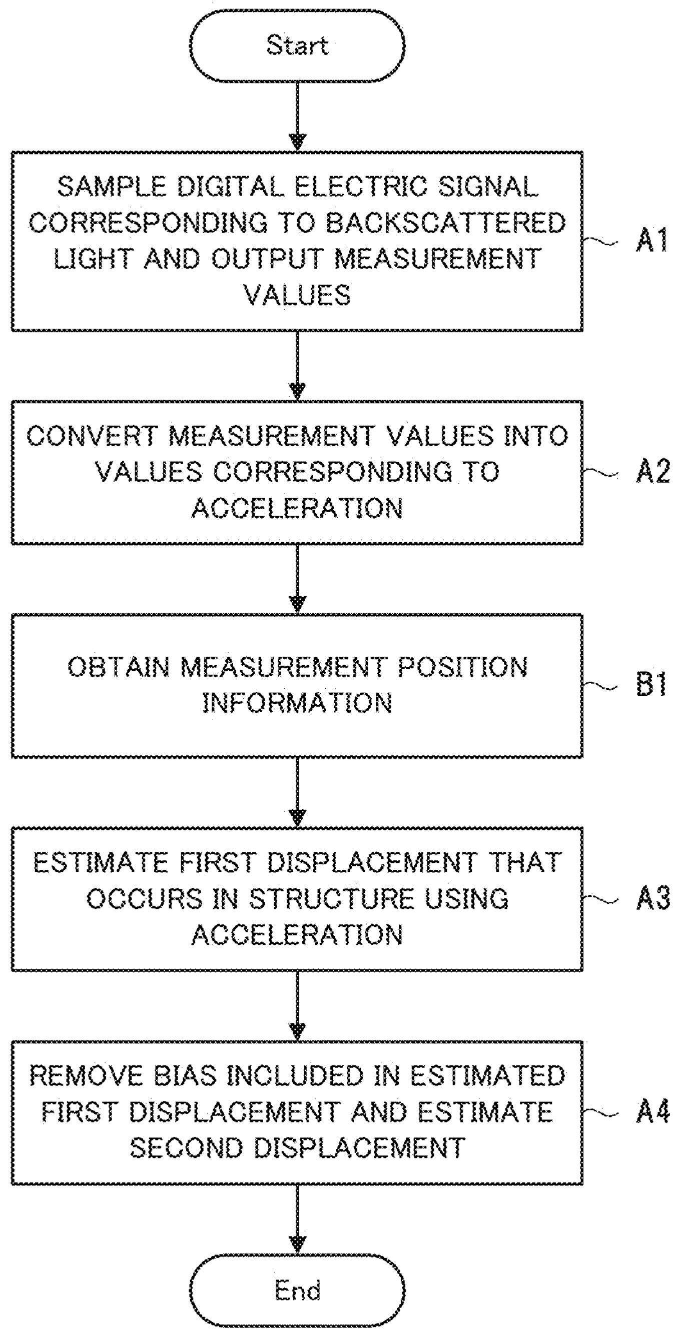
FIG. 7 is a diagram illustrating the operations of the displacement estimation apparatus of the second example embodiment.

Operations of the displacement estimation apparatus in the second example embodiment will be described below using FIG. 7. FIG. 7 is a diagram illustrating the operations of the displacement estimation apparatus of the second example embodiment. In the following description, the drawings will be referenced as appropriate. In addition, in the second example embodiment, by operating the displacement estimation apparatus, the displacement estimation method is implemented. Thus, description of the displacement estimation method in the second example embodiment is replaced with the following description of operations of the displacement estimation apparatus.

Since steps A1 to A4 were already illustrated in the first example embodiment, steps A1 to A4 will not be described in detail.

In step B1, the measurement position obtaining unit 61 obtains the measurement position information in which the measurement positions in the axial direction of the optical fiber cable 20 and positions in the structure 200 are associated with each other.

Next, in steps A3 and A4, the first displacement estimation unit 11 and the second displacement estimation unit 12 select the channel representing the measurement position in the structure 200 with reference to the measurement position information.

In step A3, when the first displacement estimation unit 11 selects a channel, a channel corresponding to a position where the displacement is assumed to be largest in the structure 200 is determined with reference to the measurement position information. Then, the first displacement estimation unit 11 estimates the first displacement that has occurred in the structure 200 using the estimated acceleration.

Furthermore, when a plurality of channels are selected, selection is performed so as to include the channel corresponding to the position where the displacement is assumed to be largest with reference to the measurement position information.

Then, the first displacement estimation unit 11 estimates the first displacement that has occurred in the structure 200 using the estimated acceleration.

In step A4, when the second displacement estimation unit 12 selects a channel, a channel corresponding to a portion of the structure 200 where the displacement is expected to be largest is determined with reference to the measurement position information.

After that, the second displacement estimation unit 12 removes the dynamically changing bias included in the estimated first displacement to correct the first displacement, and estimates the second displacement.

Effects of Second Example Embodiment

In this manner, by referencing the measurement position information, displacement of the structure can be accurately estimated. In addition, utilizing an existing optical fiber cable for communication eliminates the need for installing a new sensor for obtaining displacement in a structure to be measured or the surrounding thereof.

[Program]

The program according to the second example embodiment may be a program that causes a computer to execute steps A1, A2, B1, A3 and A4 shown in FIG. 7. By installing this program in a computer and executing the program, the security ensuring apparatus and the security ensuring method according to the second example embodiment can be realized. In this case, the processor of the computer performs processing to function as the sampling unit 13, the acceleration estimation unit 14, the first displacement estimation unit 11, the second displacement estimation unit 12, and the measurement position obtaining unit 61.

Also, the program according to the second example embodiment may be executed by a computer system constructed by a plurality of computers. In this case, for example, each computer may function as any of the sampling unit 13, the acceleration estimation unit 14, the first displacement estimation unit 11, the second displacement estimation unit 12, and the measurement position obtaining unit 61.

[Physical Configuration]

Figure 8:
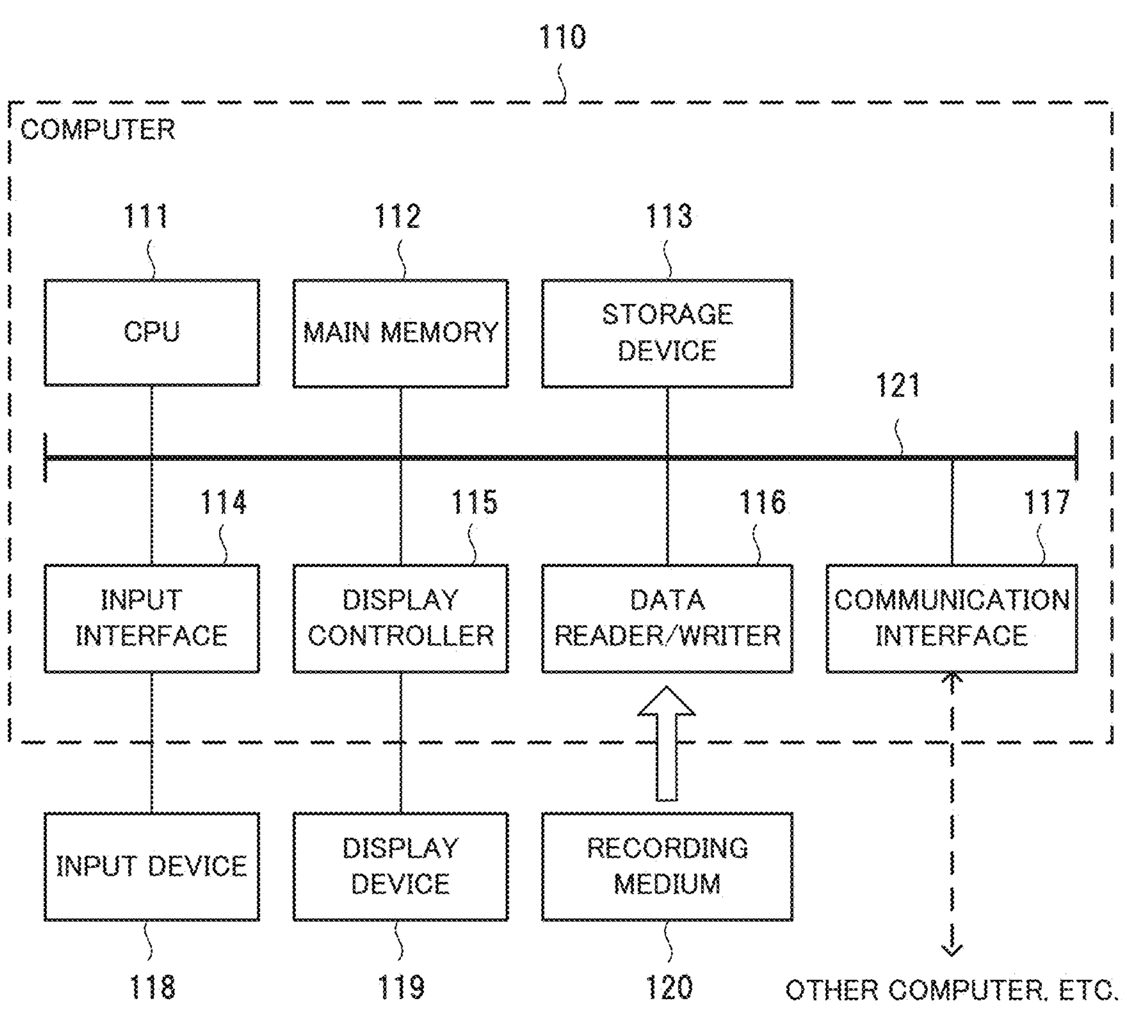
FIG. 8 is a block diagram showing an example of a computer that realizes the displacement estimation apparatus in the first example embodiment and the second example embodiment.

Here, a computer that realizes the displacement estimation apparatus by executing the program according to the first and second example embodiments will be described with reference to FIG. 8. FIG. 8 is a block diagram showing an example of a computer that realizes the displacement estimation apparatus according to the first and second example embodiments.

As shown in FIG. 8, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117. Note that the computer-readable recording medium 120 is a non-volatile recording medium.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the displacement estimation apparatus according to the first and second example embodiments can also be realized by using hardware corresponding to each unit. Furthermore, a portion of the displacement estimation apparatus may be realized by a program, and the remaining portion realized by hardware.

Although the present invention of this application has been described with reference to exemplary embodiments, the present invention of this application is not limited to the above exemplary embodiments. Within the scope of the invention of this application, various changes that can be understood by those skilled in the art can be made to the configuration and details of the present invention of this application.

INDUSTRIAL APPLICABILITY

As described above, displacement of a structure can be accurately estimated using a laid optical fiber cable. It is also useful in fields where structural displacements need to be estimated.

LIST OF REFERENCE SIGNS

10, 60 Displacement estimation apparatus
11 First displacement estimation unit
12 Second displacement estimation unit
13 Sampling unit
14 Acceleration estimation unit
20 Optical fiber cable
30 Optical measurement unit
31 Light projecting unit
32 Optical circulator
33 Light receiving unit
34 Control unit
61 Measurement position obtaining unit
100, 600 System
200 Structure
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A displacement estimation apparatus comprising:
at least one memory storing instructions; and
at least one processor configured to execute the instructions to:
estimate first displacement that occurred in a structure, based on change of a signal from an optical fiber cable laid in the structure;
estimate bias included in the estimated first displacement, and calculate second displacement by removing the bias from the first displacement; and
estimate bias in a displacement occurrence period in which the first displacement has occurred using a model representing a plurality of values of the first displacement included in a time period in which displacement has not occurred and that is before or after the displacement occurrence period.

2. The displacement estimation apparatus according to claim 1,
wherein the one or more processors further:
estimates acceleration using measurement values obtained by sampling the signal, and estimates the first displacement using the estimated acceleration.

3. The displacement estimation apparatus according to claim 2,
wherein the one or more processors further:
in a case where absolute values of the measurement values are continuously larger than a predetermined value for a predetermined time period or longer, determines that a time period in which the measurement values are continuously larger than or equal to the predetermined value is the displacement occurrence period, and
in a case where absolute values of the measurement values are continuously smaller than the predetermined value for the predetermined time period or longer, determines that a time period in which the measurement values are continuously smaller than the predetermined value is the time period in which displacement has not occurred.

4. The displacement estimation apparatus according to claim 3,
wherein a channel representing a measurement position of the optical fiber cable is selected using measurement position information in which measurement positions in an axial direction of the optical fiber cable and positions in the structure are associated with each other.

5. The displacement estimation apparatus according to claim 3,
wherein the model is represented by a polynomial expression.

6. The displacement estimation apparatus according to claim 1,
wherein the time period before or after the displacement occurrence period is adjacent to the displacement occurrence period.

7. A displacement estimation method in which
a processing apparatus:
estimates first displacement that occurred in a structure, based on change of a signal from an optical fiber cable laid in the structure;
estimates bias included in the estimated first displacement, and calculates second displacement by removing the bias from the first displacement; and estimates bias in a displacement occurrence period in which the first displacement has occurred, using a model representing a plurality of values of the first displacement included in a time period in which displacement has not occurred and that is before or after the displacement occurrence period.

8. The displacement estimation method according to claim 7, in which the processing apparatus further estimates acceleration using measurement values obtained by sampling the signal, and estimates the first displacement using the estimated acceleration.

9. The displacement estimation method according to claim 8, in which the processing apparatus further:

in a case where absolute values of the measurement values are continuously larger than a predetermined value for a predetermined time period or longer, determines that a time period in which the measurement values are continuously larger than or equal to the predetermined value is the displacement occurrence period, and in a case where absolute values of the measurement values are continuously smaller than the predetermined value for the predetermined time period or longer, determines that a time period in which the measurement values are continuously smaller than the predetermined value is the time period in which displacement has not occurred.

10. The displacement estimation method according to claim 9, wherein a channel representing a measurement position of the optical fiber cable is selected using measurement position information in which measurement positions in an axial direction of the optical fiber cable and positions in the structure are associated with each other.

11. The displacement estimation method according to claim 10, wherein the model is represented by a polynomial expression.

12. The displacement estimation method according to claim 7, wherein the time period before or after the displacement occurrence period is adjacent to the displacement occurrence period.

13. A non-transitory computer-readable recording medium that includes a program recorded thereon, the program including instructions that cause a computer to:

estimate first displacement that occurred in a structure, based on change of a signal from an optical fiber cable laid in the structure;

estimate bias included in the estimated first displacement, and calculate second displacement by removing the bias from the first displacement; and estimate bias in a displacement occurrence period in which the first displacement has occurred, using a model representing a plurality of values of the first displacement included in a time period in which displacement has not occurred and that is before or after the displacement occurrence period.

14. The non-transitory computer-readable recording medium according to claim 13, wherein the program further causes the computer to estimate acceleration using measurement values obtained by sampling the signal, and estimates the first displacement using the estimated acceleration.

15. The non-transitory computer-readable recording medium according to claim 14, wherein the program further causes the computer to:

in a case where absolute values of the measurement values are continuously larger than a predetermined value for a predetermined time period or longer, determine that a time period in which the measurement values are continuously larger than or equal to the predetermined value is the displacement occurrence period, and in a case where absolute values of the measurement values are continuously smaller than the predetermined value for the predetermined time period or longer, determine that a time period in which the measurement values are continuously smaller than the predetermined value is the time period in which displacement has not occurred.

16. The non-transitory computer-readable recording medium according to claim 15, wherein the program further causes the computer to select a channel representing a measurement position of the optical fiber cable using measurement position information in which measurement positions in an axial direction of the optical fiber cable and positions in the structure are associated with each other.

17. The non-transitory computer-readable recording medium according to claim 13, wherein the model is represented by a polynomial expression.

18. The non-transitory computer-readable recording medium according to claim 13, wherein the time period before or after the displacement occurrence period is adjacent to the displacement occurrence period.

19. A displacement estimation apparatus comprising:

at least one memory storing instructions; and at least one processor configured to execute the instructions to:

estimate first displacement that occurred in a structure, based on change of a signal measured from Rayleigh scattered light generated when light propagates through an optical fiber cable laid in the structure; and estimate bias included in the estimated first displacement, and calculating second displacement by removing the bias from the first displacement.

* * * * *